(12) United States Patent
Hansen-Turton

(10) Patent No.: US 7,984,467 B2
(45) Date of Patent: Jul. 19, 2011

(54) METHOD AND SYSTEM FOR PROVIDING AN ELECTRONIC PROGRAM GUIDE

(75) Inventor: Brian Hansen-Turton, Montgomery, PA (US)

(73) Assignee: STMicroelectronics, Inc., Coppell, TX (US)

( * ) Notice: Subject to any disclaimer, the term of this patent is extended or adjusted under 35 U.S.C. 154(b) by 1059 days.

(21) Appl. No.: 10/996,097

(22) Filed: Nov. 23, 2004

(65) Prior Publication Data

US 2006/0174269 A1     Aug. 3, 2006

(51) Int. Cl.
- G06F 13/00 (2006.01)
- G06F 3/00 (2006.01)
- H04N 5/445 (2011.01)

(52) U.S. Cl. ....................................................... 725/38
(58) Field of Classification Search .................... 725/37, 725/46, 47, 58, 134, 142; 715/716, 717, 715/718
See application file for complete search history.

(56) References Cited

U.S. PATENT DOCUMENTS

| | | | |
|---|---|---|---|
| 5,361,091 A * | 11/1994 | Hoarty et al. ................. | 725/119 |
| 5,534,911 A * | 7/1996 | Levitan ........................... | 725/46 |
| 5,758,257 A | 5/1998 | Herz et al. | |
| 6,411,343 B1 | 6/2002 | Macrae et al. | |
| 6,449,767 B1 * | 9/2002 | Krapf et al. .................. | 725/110 |
| 6,456,338 B1 | 9/2002 | Yuen | |
| 6,486,920 B2 * | 11/2002 | Arai et al. ..................... | 348/563 |
| 6,526,578 B2 | 2/2003 | Satterfield | |
| 6,601,237 B1 * | 7/2003 | Ten Kate et al. ............... | 725/47 |
| 6,665,870 B1 | 12/2003 | Finseth et al. | |
| 6,670,971 B1 * | 12/2003 | Oral .............................. | 715/769 |
| 6,876,970 B1 * | 4/2005 | Silver et al. ................... | 704/275 |
| 7,421,724 B2 * | 9/2008 | Klosterman et al. ............ | 725/42 |
| 2002/0057893 A1 * | 5/2002 | Wood et al. ..................... | 386/46 |
| 2002/0144267 A1 * | 10/2002 | Gutta et al. ..................... | 725/46 |
| 2002/0157098 A1 * | 10/2002 | Zustak et al. ................... | 725/51 |
| 2003/0093792 A1 * | 5/2003 | Labeeb et al. .................. | 725/46 |
| 2003/0097657 A1 * | 5/2003 | Zhou et al. ..................... | 725/46 |
| 2003/0163811 A1 * | 8/2003 | Luehrs ............................ | 725/25 |
| 2004/0111745 A1 * | 6/2004 | Schein et al. ................... | 725/46 |
| 2004/0123318 A1 * | 6/2004 | Lee et al. ........................ | 725/46 |
| 2004/0205816 A1 * | 10/2004 | Barrett ............................. | 725/49 |

* cited by examiner

*Primary Examiner* — Andrew Y Koenig
*Assistant Examiner* — Rong Le
(74) *Attorney, Agent, or Firm* — Lisa K. Jorgenson; William A. Munck

(57) ABSTRACT

In a method for providing a program guide in a program receiver, program schedule data is received, wherein the program schedule data associates programs with time slots on a particular channel of a plurality of channels. For a first time slot of a virtual channel, and using the program schedule data, a first program is selected from a first channel available for reception in a first selected time slot. For a second time slot of the virtual channel, a second program is selected from a second channel available for reception in a second selected time slot. In response to a request to display a schedule of programs, a schedule of the virtual channel is displayed, including the first and second programs scheduled respectively in the first and second time slots of the virtual channel.

20 Claims, 3 Drawing Sheets

METHOD AND SYSTEM FOR PROVIDING AN ELECTRONIC PROGRAM GUIDE

BACKGROUND OF THE INVENTION

1. Field of the Invention

The present invention relates generally to methods and systems for producing and displaying an electronic program guide in an entertainment device that receives selected programs, and more specifically to methods and systems for creating and using a custom virtual channel in an entertainment device that receives selected programs.

2. Description of the Prior Art

Program receivers for cable, satellite, and broadcast television systems, which may also be referred to as set top boxes or receivers, provide viewers with a large number of television programs broadcast on a large number of television channels. To determine what program a viewer would like to watch, users may consult a printed television program schedule to determine what programs will be broadcast at a particular time. More recently, electronic program guides have been developed, wherein the program schedule information is displayed on a user's television screen. These electronic program guides allow the user to navigate through the television program schedule by pressing buttons on a remote control.

In a typical program guide display, television programs are organized and displayed in a grid, where each row in the grid contains television programs for a particular channel. The columns in the grid correspond to a series of program periods or program timeslots for scheduled broadcast times. The user may scroll up or down to view program listings for different channels, or may pan left or right to view information about programs being broadcast at different times.

As used herein, a channel includes typical television channels broadcast over the airwaves or through cable and satellite distribution systems. In addition, a channel may be any communication link through which program signals or data are transmitted and received for current viewing or later viewing from a storage media. Thus, a channel may include a network, such as the Internet, through which data is transmitted for present, real-time viewing, or a medium through which data is transmitted more slowly, not in real-time, and viewed later when some or all data is received and can be viewed at the intended speed or frames per second.

It is not uncommon for a program provider to offer hundreds of channels of programs, which can make the viewer's task of selecting a program to watch tedious and time-consuming. With so many channels and programs to choose from, the user may spend too much time searching for a program rather than watching the program.

Prior art electronic program guides have provided some tools for enhancing the search for programs. For example, prior art program guides allow the user to select "favorite channels" from the hundreds of channels available, and display only the favorite channels in a program schedule grid from which the viewer may choose a program to watch. This schedule display method filters out hundreds of channels and makes the selection from a few favorite channels easier and quicker.

While the use of favorite channels can make program selection easier, the viewer still has to scroll through all the favorite channels. With hundreds of channels available, the user may have selected dozens of favorite channels, which means there is still a lot of information displayed in the program schedule grid and it may still take a while to select a program to watch.

It should be apparent to those persons skilled in the art that a need exists for an improved method and system for producing and displaying an electronic program guide that provides a program viewer with an efficient and user-friendly way of selecting programs to view.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DESCRIPTION OF THE PREFERRED EMBODIMENTS

Figure 1:
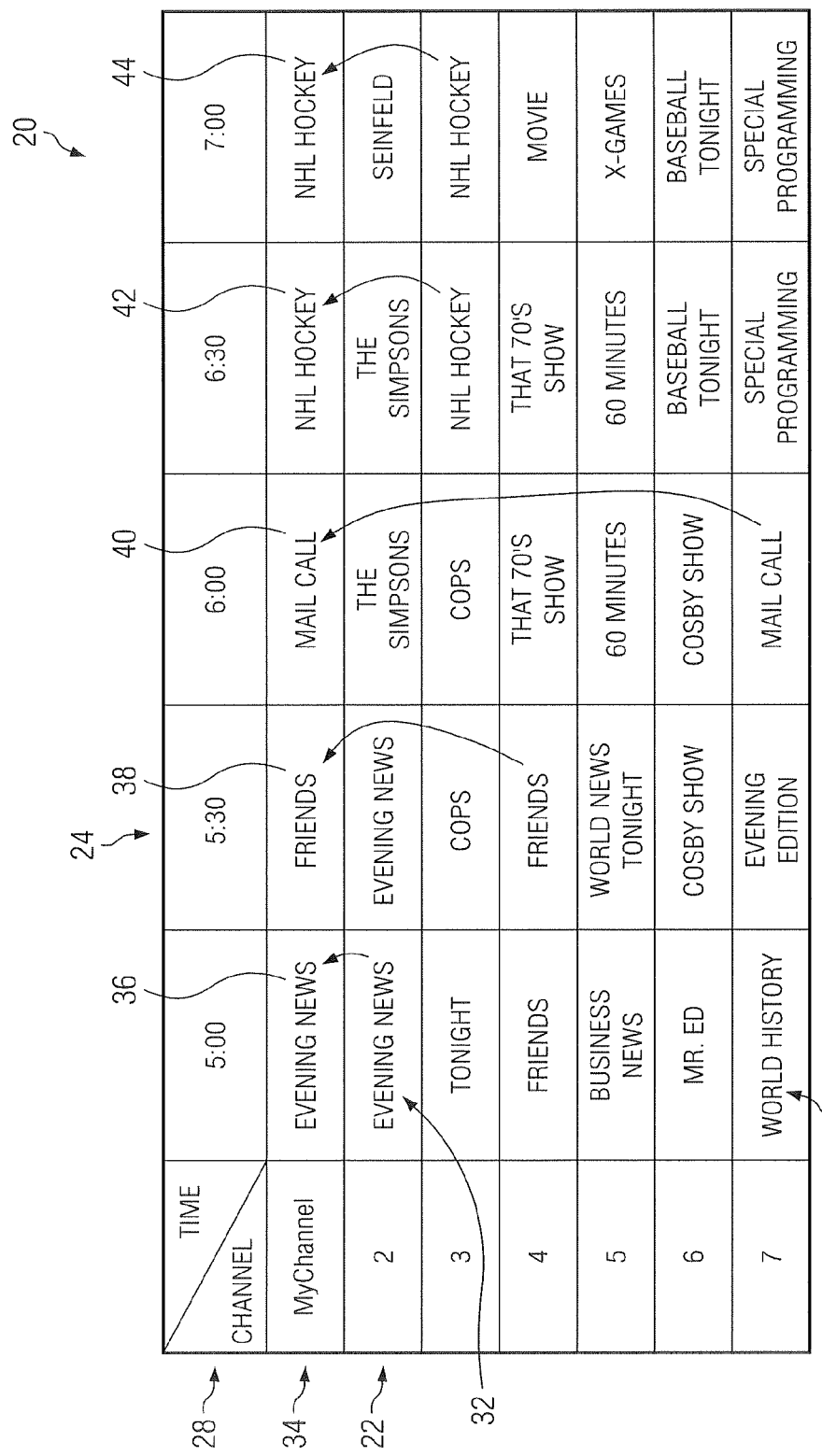
FIG. 1 illustrates a program schedule grid, which may be electronically displayed to a user of the method and system of the present invention.

With reference now to the drawings, and in particular with reference to FIG. 1, there is depicted a program schedule grid 20 in accordance with the method and system of the present invention. As illustrated, program schedule grid 20 includes a plurality of channel rows and time slot columns, such as channel row 22 and time slot column 24. A plurality of available channels may be listed in channel label column 26. The time of day for time slot columns 24 may be labeled in time slot label row 28.

Program description information, such as the program title "World History" 30, is displayed in program schedule grid 20 at an intersection of a selected channel row 22 and time slot column 24. For example, at reference number 32, the program description information is the title of the program, which in this case is "Evening News." Therefore, program schedule grid 20 in FIG. 1 displays program titles as program description information 30. In alternative embodiments, other information, or additional information, may be displayed to describe programs.

According to an important aspect of the present invention, a channel row identified as "MyChannel" 34 is shown at the top of program schedule grid 20. MyChannel 34 is a virtual channel (which may also be referred to herein as virtual channel 34,) which means that MyChannel 34 does not exist as a channel that is broadcast by a particular channel or network broadcaster, nor is it a channel provided by a network or program provider, or a cable or satellite provider. Virtual channel 34 is an aggregation of programs that are selected from programs that are available on other channels, or selected programs that may be received in other ways.

As illustrated in the example of FIG. 1, the programs displayed in virtual channel row 34 are selected from programs being broadcast in the same time slot on a different channel. For example, time slot 36 displays program description information 30 copied from, or derived from, time slot 32, which indicates the program entitled "Evening News." Similarly, time slot 38 in virtual channel 34 includes program information 30 from channel 4 at 5:30, which is the "Friends" program. At 6:00 and 7:00, time slot 40 includes program description information 30 from channel 7. At 6:30, virtual channel 34 time slots 42 and 44 include program description information 30 from channel 3 at the respective 6:30 and 7:00 time slots.

When a user displays program schedule grid 20 and decides to watch the currently indicated program in virtual channel 34, the user will actually be tuned to receive a program being broadcast on another channel, according to shown in the example in FIG. 1. If a user tunes into virtual channel 34, and leaves the tuner on that channel over a period of several time slots, the tuner will automatically tune to the programs selected from other channels, as indicated by the sequence of programs displayed in the channel row of MyChannel 34 in FIG. 1.

Figure 2:
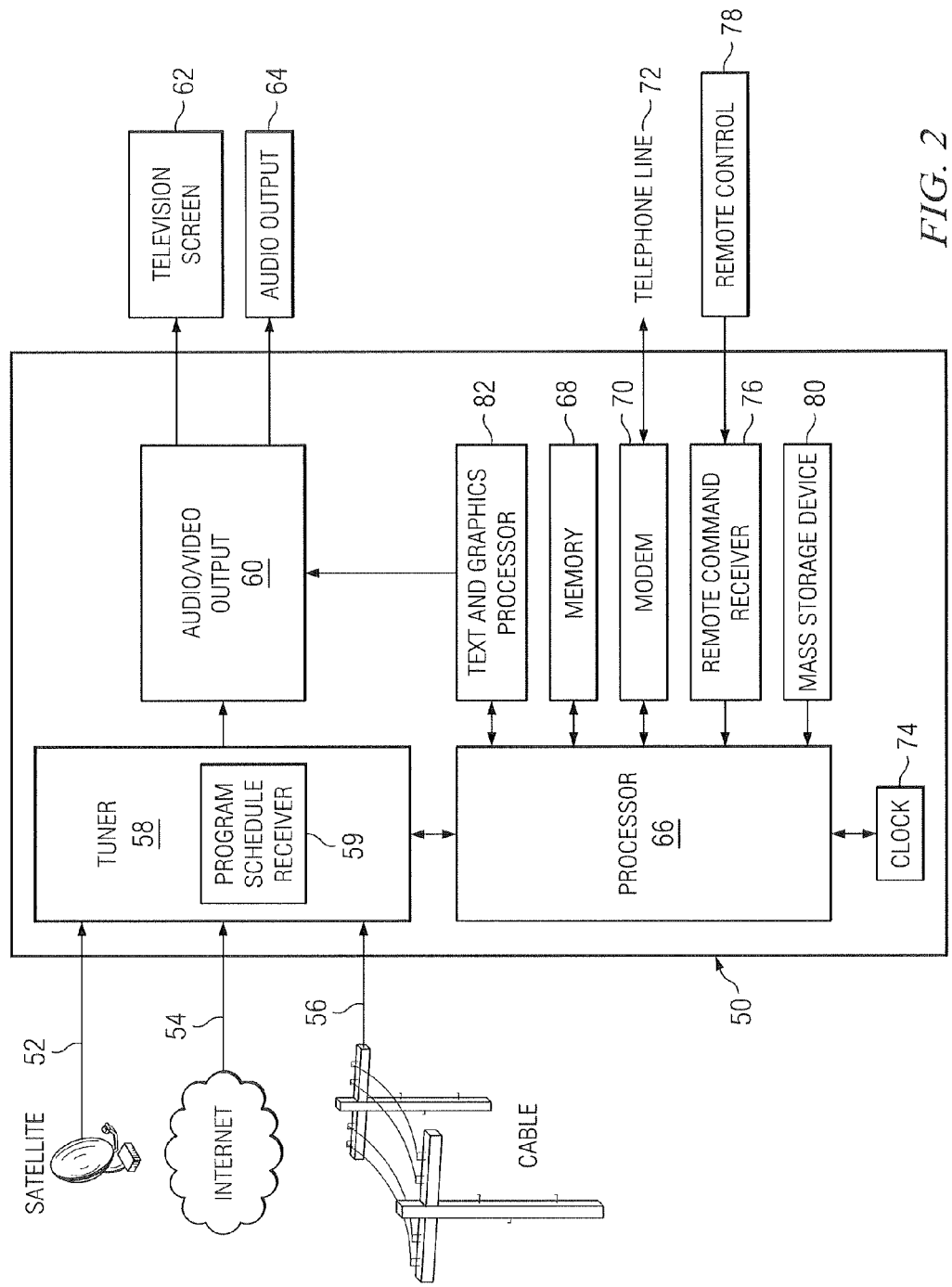
FIG. 2 is a high-level schematic block diagram of a system for providing an electronic program guide in accordance with the method and system of the present invention.

Referring now to FIG. 2, there is depicted a high-level schematic block diagram of a system for providing an electronic program guide in accordance with the method and system of the present invention. As illustrated, program receiver 50 is coupled via communication links to one or more program sources, which provide programs that may be received and viewed by the program receiver user. For example, satellite data 52 may be received from a satellite receiver that receives signals from an orbiting satellite. Internet data 54 may be received from a data connection to the Internet that allows program receiver 50 to receive or download program data. Cable data 56 may be received via connection to a cable system television program provider, such as a community cable television network which provides program data in either analog or digital formats.

Program receiver 50 includes tuner 58 that is coupled to one or more sources of program data, such as satellite data 52, Internet data 54, or cable data 56. Tuner 58 includes means for receiving, decoding, demodulating, and otherwise processing analog or digital data that represents programs transmitted on a particular channel, or programs available from a particular data source, during a particular program time slot. Tuner 58 receives program data that represents audio data, or video data, or both, corresponding to a particular program. And tuner 58 may also receive program schedule data, using program schedule receiver 59, wherein the schedule data represents the particular channel, and time slot for available program data. Tuner 58 is capable of receiving data that is streamed in real time, which may be referred to as live streaming, or data that is stored in a file that may be requested and downloaded at any time, or during selected time periods.

As illustrated, tuner 58 outputs data to audio/video processor 60, which is used to provide outputs for television screen 62 and audio output device 64. Therefore, audio/video processor 60 may include digital-to-analog converters for producing low-level audio signals for one or more audio channels of program sound. Additionally, audio/video processor 60 may include converters for processing video data and producing signals properly formatted to drive either a television or another type of display screen. For example, video may be processed and output as a composite video signal, an S-video signal, component video signals, or data formatted to drive high-definition digital displays or VGA-type computer displays.

Tuner 58 is also coupled to processor 66, which may be implemented with a microprocessor or microcontroller integrated circuit, or other specialized application specific integrated circuit. Processor 66 is capable of sending control signals to tuner 58 that instructs tuner 58 to receive particular program data from a particular channel, or from a particular network address for downloading a data file or receiving streaming media data. Additionally, processor 66 is able to receive data from tuner 58, which data includes status information, and in some cases program schedule data that has been received from program data sources by program schedule receiver 59.

Processor 66 may include internal memory, and it may be coupled to external memory 68, particularly when the capacity of internal memory is too small to perform all needed functions. Memory 68 may be used to store executable program instructions that are executed by processor 66. Memory 68 may also be used to store program schedule data that represents the particular programs that are available in each time slot for each channel. Memory 68 is also a computer readable storage medium that can be used to store instructions that, when executed by a computer or processor 66, cause the computer to perform a method for providing a program guide for a program receiver in accordance with the method and system of the present invention. Data representing selections and preferences for virtual channel 34 may also be stored in memory 68.

Processor 66 may also be coupled to modem 70, which in turn may be coupled to telephone line 72 for receiving program schedule data or other instructions or software for controlling the operation of program receiver 50.

Processor 66 is coupled to clock 74, which keeps track of the time of day and the date, which is important to displaying the appropriate program schedule information as shown in FIG. 1, and changing the program received by tuner 58 at the proper time.

Processor 66 is coupled to remote command receiver 76, which receives and processes commands from remote control 78. Such commands may be transmitted by an infrared data link, a radio frequency (RF) data link, or other known methods of transferring data commands over a relatively short distance. The user of program receiver 50 may provide input data or other commands to change the channel and control the operation of program receiver 50 by pressing buttons on a conventional remote control.

Processor 66 may also be coupled to a mass storage device 80, which may be used to store program data received by tuner 58 so that it may be viewed at a later time, or may be used to store software or data used in the operation of program receiver 50. Mass storage device 80 may be implemented with a hard disk drive, a writable and readable optical disk drive, solid state memory, or other known memory devices that may be used to store the large amounts of digital data required to store several hours of program data.

Processor 66 is also coupled to text and graphics processor 82, which is used to produce display data for displaying text and graphics on television screen 62. Data output by text and graphics processor 82 may be mixed with video information in audio/video processor 60 so that text and graphics may be superimposed over program information in order to display a program schedule grid, such as program schedule grid 20 shown in FIG. 1. Text and graphics generator 82 may also be used to generate menus, prompts, instructions, and other textual and graphical information needed to provide a pleasing and easy-to-use graphical user interface to program receiver 50.

Figure 3:
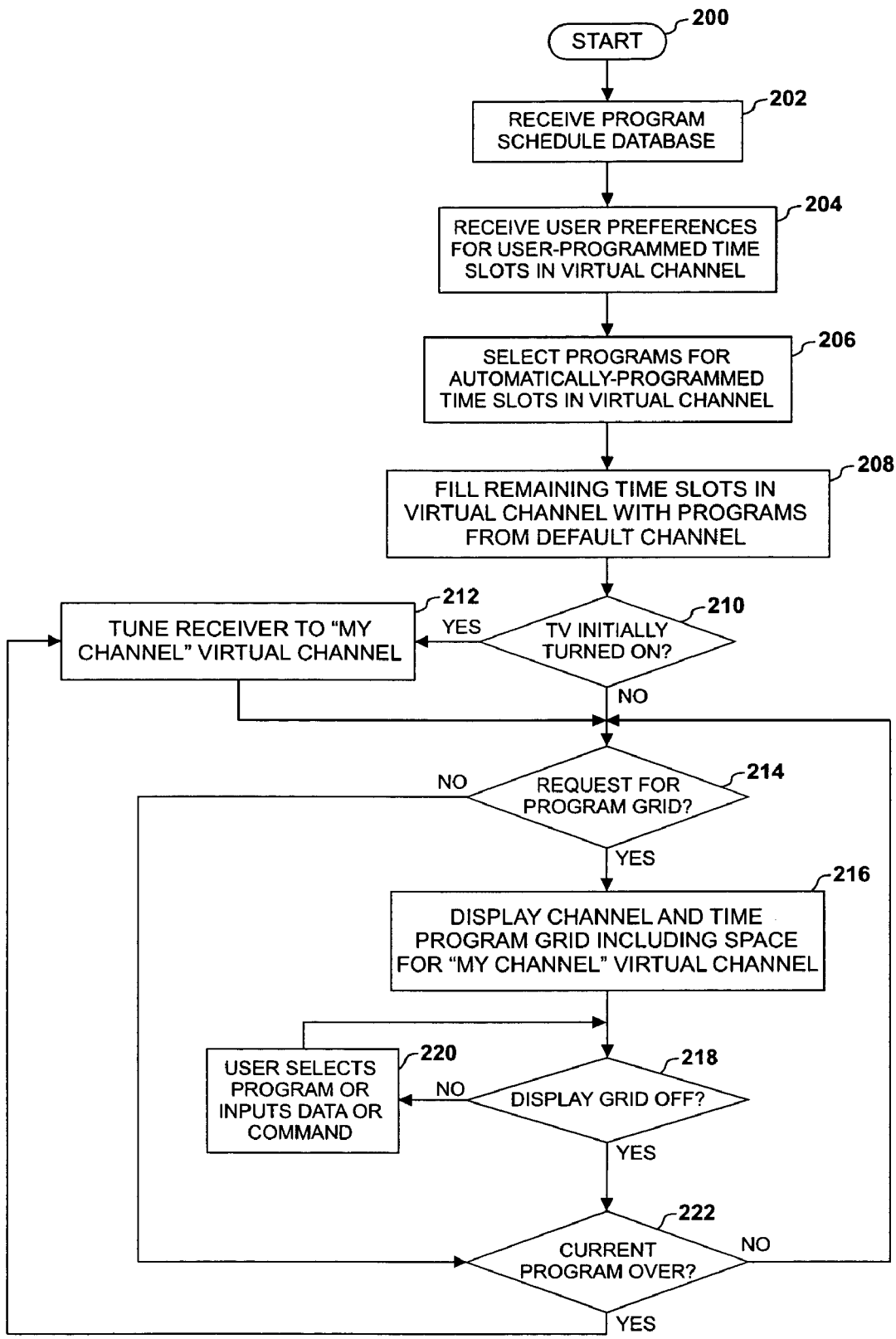
FIG. 3 is a high-level logic flowchart that illustrates the operation of displaying an electronic program guide in accordance with the method and system of the present invention.

With reference now to FIG. 3, there is depicted a high-level logic flowchart that illustrates the operation of the method and system of the present invention. As depicted, the process begins at block 200 and thereafter passes to block 202, wherein the process receives data contained in a program schedule data base. In a preferred embodiment, this data includes data records that associate a program, having a program name, with a channel (or other locator information), and a time of availability. The time of availability is typically a broadcast time slot, which is usually a half-hour period during a broadcast day. This availability data may include several times if the program will be broadcast more than once. For a program that is available on a network such as the Internet, the time available data may indicate that it is available at anytime, or that the program will be streamed live on the network live at a particular time. The program locator information in a preferred embodiment is a broadcast channel that is available over the public airwaves, on a cable distribution system, or via a satellite receiver. Other locator information may include a network address on either a local area network or the Internet, which uses a Universal Resource Locator (URL).

Thus, the purpose of step 202 is to receive the data that is necessary to create and display program schedule grid 20 in FIG. 1. At a minimum, this data includes program names, channels, and the respective time slot data. Additional data may be received, such as program details, which may include a program summary, a content rating, a price if the program is distributed on a pay-per-view basis, and other similar information that may aid the user in selecting a program to view or listen to.

The program schedule information may be received multiplexed together with program information using program schedule receiver 59 in tuner 58 to decode the information. Or, program schedule information may be received via an alternate data link, such as modem 70, which is connected to telephone line 72 as shown in FIG. 2.

Next, the process receives user preferences for user-programmed time slots in virtual channel 34, as depicted at block 204. As shown in FIG. 1, the "MyChannel" virtual channel 34 includes programs available on other channels, or on other networked file servers, that are selected for the user or television viewer. Some of these selections may be made by the user, and some program selections may be made by alternative selection means, or automatic selections based upon selection algorithms. In step 204, program receiver 50 receives input directly from the user regarding user-programmed time slots. In one embodiment, the user may browse program schedule grid 20 by scrolling or paging through the available programs, selecting a program, and indicating a time slot in virtual channel 34 where the user wants to place the selected program.

For example, as shown in FIG. 1, the user may display program schedule grid 20 and select the Evening News program 32, which is broadcast on channel 2 at 5:00, so that it will be included in virtual channel 34 at 5:00. Similar selections may be made to fill other time slots in virtual channel 34. Selections for virtual channel 34 may be made for each day of the week. In one embodiment, arrow keys on a remote control may be used in the selection process to move between selected programs and time slots. Once a program is selected, arrow keys may be used to move to select a time slot in virtual channel 34 in order to place the selected program into that time slot.

In alternative embodiments, step 204 may be implemented using a computer and software that enables the user to select programs for time slots in virtual channel 34. Once the user's selections are known and stored in a data file, the data file may be transferred to program receiver 50 via a local area network, or via Internet data connection 54. Additionally, a program provider may provide a website with appropriate web pages and scripts that guide the user through the selection of programs for virtual channel 34. Such a website would display available program choices and allow the user to select programs and fill time slots in virtual channel 34. When the user is finished making selections at the website, selection information may be transferred to program receiver 50 through satellite data 52, Internet data 54, cable data 56, or via modem 70.

Once the user has selected specific programs, the process selects programs for automatically-programmed time slots in virtual channel 34, as illustrated at block 206. In this step, the process determines which time slots have not been programmed by the user and automatically selects programs to fill some or all of these time slots. In a preferred embodiment, algorithms are used to select programs that the user will enjoy watching. Such algorithms may examine programs that have already been selected by the user to determine selection characteristics that describe the types of programs that the user has selected. For example, by examining user selections, the algorithm may determine that the user enjoys watching sports programs, and home improvement programs. These selection characteristics—programs about sports and home improvement—may be further characterized by a type of sport, or a type of home improvement, such as programs about gardening rather than building or construction.

Once the algorithm has determined program selection characteristics, the algorithm examines other programs in the program schedule data to determine if there is a match between the selection characteristics of programs that the user has selected and selection characteristics of other available programs that the user has not selected. If there is a match, the algorithm may select such a matching program and put it in an empty time slot in virtual channel 34.

The algorithm for selecting programs may be based upon programs that have already been selected by the user, or the algorithm may use preferences entered by the user regarding selection characteristics. For example, the user may select a preference from a menu that requests that empty time slots be filled with sports programs, or a movie or television show staring a particular actor or actress.

If program receiver 50 includes a mass storage device 80, the algorithm for selecting programs in virtual channel 34 may include time shifting, wherein the program selected for a virtual channel time slot is not necessarily broadcast during that same time period in virtual channel 34. For example, referring to FIG. 1, Evening News 32 may be recorded in the 5:00 time slot and placed in the 5:30 time slot in MyChannel 34, wherein it is recalled and played from mass storage device 80 during the 5:30 time slot 38. Similarly, programs available at specific times, or at any time, may be automatically selected to fill in the automatically-programmed time slots in virtual channel 34. Time shifting may also be used when user-programmed time slots are filled Once the user has selected programs, and some programs have been automatically selected, the process fills in the remaining time slots in virtual channel 34 with programs from a default channel, as depicted at block 208. Therefore, if there are unprogrammed time slots after proceeding through steps 204 and 206, the process will fill the remaining time slots in virtual channel 34 from a user's favorite channel, or other default channel, so that eventually all the time slots are filled in virtual channel 34. For example, a default channel might be a 24 hour news channel, or an all sports channel. It may work best if the default channel has half-hour programs so that the time slots may be filled with complete programs. In some embodiments, the default channel may be different for different days of the week, or different times of the day. For example, the default channel on Sunday may be a sports channel, while the default channel on a weekday may be a news channel. Similarly, a default channel for the after school hours may be a cartoon channel, while the default channel in the evening may be a major network channel.

Next, the process determines whether the television has been initially turned on, as illustrated at block 210. In this step, if the television has just been turned on or powered up (or similarly if the program receiver 50 has just been turned on), the process proceeds to block 212 wherein the receiver is tuned to "MyChannel", the virtual channel. Therefore, as soon as the television, or program receiver 50, is turned on, the tuner tunes to the program scheduled in virtual channel 34 so that the user is likely to be viewing a program of choice without having to make any additional channel selections. If the television has not been initially turned on, the process proceeds to block 214.

At block 214, the process determines whether or not the user has made a request to display a program schedule grid on the television screen. If there is no pending request for displaying a program grid, the process proceeds to block 222. In a preferred embodiment, the user may make a request to display the program grid by pressing a button on remote control 78, which transmits a command that is received in program receiver 50 by remote command receiver 76.

After receiving a request for the program grid, the process displays the channel and time program grid that includes space for displaying the "MyChannel" virtual channel, as depicted at block 216. This step is implemented by displaying a schedule grid similar to program schedule grid 20 in FIG. 1, wherein the virtual channel "MyChannel" 34 is displayed in the grid. Text and graphics generator 82 can be used to generate data that can be interpreted and incorporated into video display signals by audio/video processor 60 and displayed as a program grid on television screen 62.

Next, the process determines whether or not it is time to turn the display grid off, as illustrated at block 218. The display grid may be displayed for a short period of time if the user does not input commands or otherwise interact with the grid. If the user is paging through the grid and selecting channels to view more detailed information, the display of the grid continues and the process passes to block 220. In block 220, the user is allowed to interact with the displayed program grid by selecting a program or inputting other data or commands while the program schedule grid is displayed.

If the process has determined that it is time to turn the display grid off, the process turns the grid off and passes to block 222, wherein the process determines whether or not the currently displayed or playing program is over. If the program is not over, the process iteratively returns to block 214. Alternatively, if the current program is over, which usually means that the current time is at the end of the time slot that ends on the hour or half-hour, the process passes to block 212 wherein the tuner is set to receive the next program scheduled in virtual channel 34. By switching back to virtual channel 34, a person may watch a program on another channel and then be tuned back to virtual channel 34, which is most likely to have a program coming up in the next time slot that the user will enjoy watching. In some embodiments, the user may be prompted before automatically switching back to the virtual channel, at which point the user can agree or request that the tuner remain on the current channel.

Note that the user may freely tune to channels other than the virtual channel after block 212, where the television has been initially turned on. Also note that the process of receiving program database information, and the process or receiving user-programmed time slots, or automatically-programmed time slots has been depicted in the flowchart of FIG. 3 in a certain order, with the virtual channel program selections shown at the top of the flowchart. Persons skilled in the art should recognize that these selections and inputs may be made at other times, or in parallel with other processes. The operating steps of program receiver 50 have been shown in this exemplary order to illustrate the operating principles of the invention and for ease of understanding. The processes in FIG. 3 may be executed in a different order, or some processes may be executed in the background or simultaneously with other processes.

While the example of the present invention shown in FIG. 1 has only one virtual channel 34 displayed, other embodiments may include more than one virtual channel. For example, if program receiver is used by several persons or family members, each person may be allocated memory and display space for their own personal virtual channel. Alternatively, different virtual channels may be programmed according to different themes, moods, or subject matter. For example, one virtual channel may be programmed for football, while another may have a quiet mood with classical music or other performing arts programs.

The present invention has the advantage of quickly and easily providing a program viewer with a program that the viewer has selected, or a program that has been automatically selected for the viewer based upon information from or about the user. When program receiver 50 is turned on, it may be programmed to immediately tune to virtual channel 34, which is comprised of programs selected from other channels, from programs available on a data network, or from programs that have been previously recorded. In some situations, the viewer just needs to turn the equipment on and the selected programs will continue to play for the rest of the evening, without the viewer paging through hundreds of programs displayed in a program schedule grid.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for providing a program guide for a program receiver comprising the steps of:
   receiving program schedule data that associates programs with time slots on a particular channel of a plurality of channels;
   displaying a program schedule grid using the received program schedule data;
   for a first time slot of a virtual channel, receiving a selection from the displayed program schedule grid of a first program from a first channel available for reception in a first selected time slot, the first time slot of the virtual channel corresponding to the first selected time slot of the first channel;
   for a second time slot of the virtual channel, receiving a selection from the displayed program schedule grid of a second program from a second channel available for reception in a second selected time slot;
   in response to a request to display a schedule of upcoming programs, displaying a schedule of the virtual channel that includes the first and second programs scheduled respectively in the first and second time slots of the virtual channel; and
   when a time slot of a program on a non-virtual channel has ended, tuning the program receiver from the non-virtual channel to the virtual channel in order to display a program on the virtual channel selected by a user.

2. The method for providing a program guide according to claim 1 wherein the program receiver is a television program receiver.

3. The method for providing a program guide according to claim 1 further comprising the step of prompting the user before tuning the program receiver from the non-virtual channel to the virtual channel.

4. The method for providing a program guide according to claim 3 further including the steps of:
- analyzing the selection of the first and second programs to determine selection characteristics;
- for a third time slot of the virtual channel, automatically selecting a third program from one of the plurality of channels that is available for reception in a third selected time slot based upon the third program having characteristics similar to the determined selection characteristics; and
- displaying the schedule of the virtual channel wherein the third program is scheduled in the third time slot of the virtual channel.

5. The method for providing a program guide according to claim 1 further including the steps of:
- identifying unassigned time slots in the schedule of the virtual channel; and
- assigning programs of a default channel to the respective unassigned time slots of the virtual channel.

6. The method for providing a program guide according to claim 1 further including the step of tuning to a currently scheduled program in the virtual channel when the program receiver is turned on.

7. The method for providing a program guide according to claim 1 wherein the program schedule grid is displayed on a website, the website comprising at least one script that guides a user through a program selection.

8. The method for providing a program guide according to claim 1 wherein the step of displaying a schedule of a virtual channel further includes displaying a program schedule grid showing programs on a channel in rows and programs scheduled at selected times in columns.

9. The method for providing a program guide according to claim 1 wherein the step of displaying a schedule of a virtual channel further includes the steps of:
- selecting, for a third program period, a third program that has a portion thereof prerecorded on a program storage device from one of the plurality of channels; and
- displaying the schedule of the virtual channel wherein the third program is scheduled in the third time slot.

10. A non-transitory computer readable storage medium storing instructions that, when executed by a computer, cause the computer to perform the steps of:
- receiving program schedule data that associates programs with time slots on a particular channel of a plurality of channels;
- displaying a program schedule grid using the received program schedule data;
- for a first time slot of a virtual channel, receiving a selection from the displayed program schedule grid of a first program from a first channel available for reception in a first selected time slot, the first time slot of the virtual channel corresponding to the first selected time slot of the first channel;
- for a second time slot of the virtual channel, receiving a selection from the displayed program schedule grid of a second program from a second channel available for reception in a second selected time slot;
- in response to a request to display a schedule of upcoming programs, displaying a schedule of the virtual channel that includes the first and second programs scheduled respectively in the first and second time slots of the virtual channel; and
- when a time slot of a program on a non-virtual channel has ended, tuning the program receiver from the non-virtual channel to the virtual channel in order to display a program on the virtual channel selected by a user.

11. The non-transitory computer readable storage medium according to claim 10 further comprising stored instructions to cause the computer to perform the step of sending the schedule of the virtual channel to a program receiver.

12. The non-transitory computer readable storage medium according to claim 11 further including stored instructions to cause the computer to perform the steps of:
- analyzing the selection of the first and second programs to determine selection characteristics;
- for a third time slot of the virtual channel, automatically selecting a third program from one of the plurality of channels that is available for reception in a third selected time slot based upon the third program having characteristics similar to the determined selection characteristics; and
- displaying the schedule of the virtual channel wherein the third program is scheduled in the third time slot of the virtual channel.

13. The non-transitory computer readable storage medium according to claim 10 further including stored instructions to cause the computer to perform the steps of:
- identifying unassigned time slots in the schedule of the virtual channel; and
- assigning programs of a default channel to the respective unassigned time slots of the virtual channel.

14. The non-transitory computer readable storage medium according to claim 10 further including stored instructions to cause the computer to perform the step of tuning to a currently scheduled program in the virtual channel when the program receiver is turned on.

15. The non-transitory computer readable storage medium according to claim 10 wherein the program schedule grid is displayed on a website, the website comprising at least one script that guides a user through a program selection.

16. The non-transitory computer readable storage medium according to claim 10 wherein stored instructions to cause the computer to perform the step of displaying a schedule of a virtual channel further includes stored instructions to cause the computer to perform the steps of displaying a program schedule grid showing programs on a channel in rows and programs scheduled at selected times in columns.

17. The non-transitory computer readable storage medium according to claim 10 wherein stored instructions to cause the computer to perform the step of displaying a schedule of a virtual channel further includes stored instructions to cause the computer to perform the steps of:
- selecting, for a third program period, a third program that has a portion thereof prerecorded on a program storage device from one of the plurality of channels; and
- displaying the schedule of the virtual channel wherein the third program is scheduled in the third time slot.

18. A system for displaying a program guide comprising:
a processor;
a program schedule receiver coupled to the processor and operable to receive program schedule data;
a graphics and text generator coupled to the processor;
a video output processor coupled to the graphics and text generator and operable to produce a video output signal;

a processor readable storage medium coupled to the processor and operable to store the program schedule data and store processor readable code that when executed cause the processor to perform the steps of:

receiving program schedule data that associates programs with time slots on a particular channel of a plurality of channels;

displaying a program schedule grid using the received program schedule data;

for a first time slot of a virtual channel, receiving a selection from the displayed program schedule grid of a first program from a first channel available for reception in a first selected time slot, the first time slot of the virtual channel corresponding to the first selected time slot of the first channel;

for a second time slot of the virtual channel, receiving a selection from the displayed program schedule grid of a second program from a second channel available for reception in a second selected time slot;

in response to a request to display a schedule of upcoming programs, displaying a schedule of the virtual channel that includes the first and second programs scheduled respectively in the first and second time slots of the virtual channel; and when a time slot of a program on a non-virtual channel has ended, tuning the program receiver from the non-virtual channel to the virtual channel in order to display a program on the virtual channel selected by a user.

19. The system for displaying a program guide according to claim 18 further including a tuner operable to receive programs, wherein the tuner is coupled to the processor and the video output processor.

20. The system for displaying a program guide according to claim 18 further including a mass storage device coupled to the processor and operable to store and play previously recorded programs.

* * * * *